United States Patent
Bailly et al.

(10) Patent No.: US 8,108,086 B2
(45) Date of Patent: Jan. 31, 2012

(54) SYSTEM FOR GUIDING AND PILOTING AN AIRCRAFT IN CASE OF INABILITY OF THE PILOTS

(75) Inventors: Jerome Bailly, Toulouse (FR); Isabelle Lacaze, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 842 days.

(21) Appl. No.: 12/136,599

(22) Filed: Jun. 10, 2008

(65) Prior Publication Data

US 2009/0319104 A1 Dec. 24, 2009

(30) Foreign Application Priority Data

Jun. 11, 2007 (FR) ...................... 07 04139

(51) Int. Cl.
*G06G 7/70* (2006.01)
*G06F 19/00* (2006.01)

(52) U.S. Cl. .............................. 701/14; 701/3

(58) Field of Classification Search .............. 701/3, 11, 701/14, 16; 244/189, 76 R, 196, 197, 183
See application file for complete search history.

(56) References Cited

U.S. PATENT DOCUMENTS

| | | | |
|---|---|---|---|
| 6,739,556 B1 * | 5/2004 | Langston | 244/189 |
| 6,917,863 B2 * | 7/2005 | Matos | 701/16 |
| 7,350,748 B2 * | 4/2008 | Matos | 244/76 R |
| 2003/0130770 A1 * | 7/2003 | Matos | 701/3 |
| 2004/0021581 A1 * | 2/2004 | Weigl | 340/945 |
| 2004/0078122 A1 * | 4/2004 | Pippenger | 701/3 |
| 2005/0237235 A1 | 10/2005 | Falcati | |
| 2007/0055434 A1 * | 3/2007 | Kohlmann | 701/100 |
| 2009/0179114 A1 * | 7/2009 | Conner | 244/189 |

FOREIGN PATENT DOCUMENTS

| | | |
|---|---|---|
| FR | 2 584 842 | 1/1987 |
| FR | 2 869 419 | 10/2005 |
| GB | 2 383 431 | 6/2003 |

OTHER PUBLICATIONS

Preliminary Search Report dated Feb. 12, 2008 w/ English translation.

* cited by examiner

*Primary Examiner* — Khoi Tran
*Assistant Examiner* — Jason Holloway
(74) *Attorney, Agent, or Firm* — Dickinson Wright PLLC

(57) ABSTRACT

An aircraft guidance and piloting system automatically guides and pilots an aircraft in the event a pilot is unable to guide or pilot the aircraft. Upon determining the pilot's inability to control the aircraft, a processor transmits an automatic engagement command to a control unit. The control unit guides and pilots the aircraft to an alternative airport for landing.

8 Claims, 1 Drawing Sheet

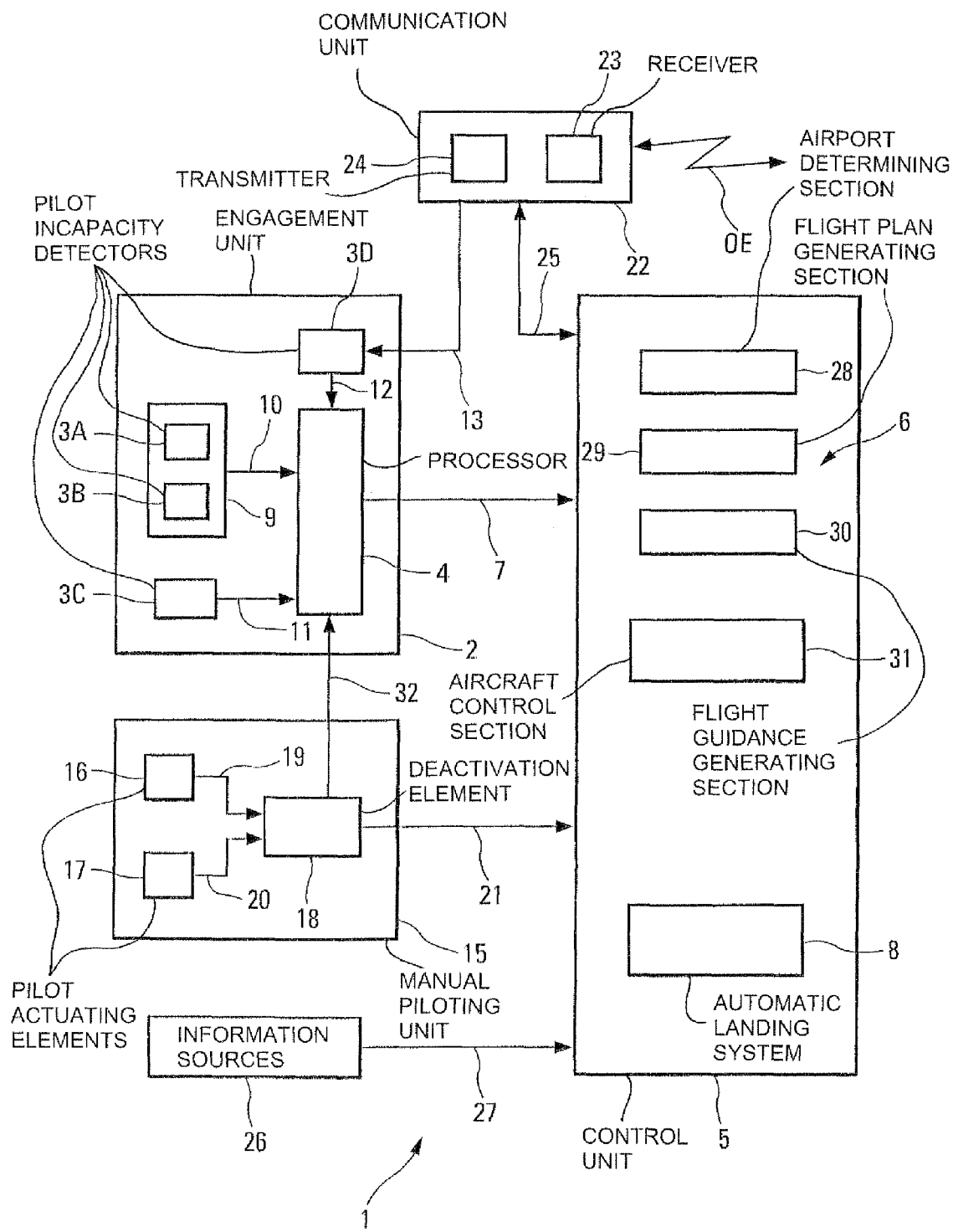

SYSTEM FOR GUIDING AND PILOTING AN AIRCRAFT IN CASE OF INABILITY OF THE PILOTS

FIELD OF THE INVENTION

The present invention relates to a guidance and piloting system for an aircraft, in particular a transport airplane, for cases of incapacity of the pilots to control the aircraft, that is, when the crew of the aircraft is no longer able to pilot the aircraft, for example following failure of the pressurization system leading to loss of consciousness among the pilots.

BACKGROUND OF THE RELATED ART

It is known that, currently, systems designed to pilot an airplane automatically are already installed on the great majority of civilian and military airplanes and make it possible, for example, to follow a pre-established flight plan, fly at a given altitude, follow a heading chosen by the pilot, and so on. These systems facilitate the work of the pilot. However, said pilot must always be the initiator of an airplane guidance task: it is in fact he who enters the flight plan into the airplane navigation system, and chooses the altitude, speed and other set points, that the automatic piloting systems must then follow. An interaction between the pilot and the automatic piloting systems is therefore necessary to fly an airplane until it has landed and come to a complete stop on a runway.

It may, however, happen, for example because of a failure of a system like the airplane pressurization system, that the crew is no longer able to pilot the airplane, particularly in the case of a loss of consciousness. In such a situation, the airplane is left to itself, and if none of the pilots regains consciousness in time, the airplane has a very strong probability of crashing, if no-one on board has sufficient capability to pilot it, whether manually or using the various automatic piloting systems (thrust control, automatic pilot, etc.).

Furthermore, if the pilots lose consciousness when the automatic pilot is engaged, the flight continues until all the fuel on board is consumed before the airplane crashes. This is because, even when the automatic pilot is engaged, actions on the part of the pilots are necessary to engage an automatic landing phase. Document FR-2 869 419 discloses a method and a device to assist in landing an aircraft on a runway.

SUMMARY OF THE INVENTION

It will be noted that other situations, such as food poisoning, dense smoke in the cockpit, dead or injured pilots following a fight in the cockpit, and so on, can also result in incapacity of the pilots to control (or pilot) the aircraft.

It is an object of the present invention is to remedy the abovementioned drawbacks. It relates to an aircraft guidance and piloting system which makes it possible, in the event of incapacity of the pilots, to control the aircraft until it lands without requiring any action on the part of the pilots.

To this end, according to the invention, said system is noteworthy in that it comprises:
  an engagement unit which comprises at least one detection means for detecting an engagement indication signaling inability of the pilots to control the aircraft and a processing means for automatically deducing therefrom and automatically sending an engagement command; and
  at least one control unit which comprises at least:
    first means for automatically guiding and piloting the aircraft towards an alternative airport when said engagement unit has sent an engagement command; and
    second means for automatically preparing and automatically executing a landing of the aircraft on said alternative airport, until the aircraft finally stops.

Thus, thanks to the invention, when an engagement indication which signals incapacity of the pilots to control the aircraft is detected, an engagement command is sent automatically to the control unit which, in this case, automatically guides and pilots the aircraft to an alternative airport and lands it at this alternative airport.

Consequently, when the pilots are no longer able to pilot the aircraft, the guidance and piloting system according to the invention replaces them and automatically controls the aircraft until it finally stops on a runway of an alternative airport. The system according to the invention thus provides a way of remedying the above-mentioned drawbacks.

In a particular embodiment, said engagement unit comprises, as detection means, at least one of the following means:
  at least one sensor chosen from all the following sensors:
    a sensor that measures the pressure inside the aircraft;
    an auxiliary sensor which measures the value of at least one particular parameter (pressure on the seats, smoke, etc.) inside the aircraft;
  at least one means, in particular a pushbutton, which can be actuated manually by an operator, for example a pilot or a member of the navigating crew; and
  a means which can receive an engagement code from outside the aircraft, for example from a control station located on the ground or a military airplane coming to the aid of the aircraft in difficulty.

Advantageously, said system also comprises a communication unit which comprises data reception means and data transmission means and which enables said system to communicate with dialog stations located outside the aircraft, for example air traffic control stations or surrounding aircraft. This makes it possible in particular for the various people involved to take the necessary measures to manage the surrounding traffic in such a crisis situation.

Furthermore, advantageously, said system also comprises a unit for reversion to manual piloting which comprises at least one first element (for example a control handle or a button for disconnecting the automatic pilot) which can be actuated and which enables an operator, and in particular the pilot, to request a reversion to manual piloting, and a second element which generates, when said first element is actuated, a deactivation command which it transmits to said control unit in order to deactivate it (and revert to a normal piloting mode).

Moreover, advantageously, said first means of said control unit comprise:
  means for automatically determining said alternative airport; and/or
  means for automatically generating a flight plan for reaching said alternative airport; and/or
  means for automatically generating guidance instructions when the aircraft is flying, enabling the latter to be guided to the alternative airport, and normal aircraft control means, to which these guidance commands are applied.

Furthermore, in a particular embodiment, said first means of said control unit comprise a first element for receiving information from outside the aircraft and at least one second element for using this information in order to guide and pilot the aircraft to the alternative airport. This information received from outside can in particular concern the alternative airport and/or the flight plan and/or guidance instructions.

In this particular embodiment, the guidance and piloting system according to the invention enables elements outside the aircraft, in particular an air traffic control station or a military airplane, to take over from pilots who are incapable of controlling the aircraft. In particular, the external means can:

- assist in the automatic guidance of the aircraft, by management of the surrounding airplanes, evacuation of the chosen runway, and so on;
- validate automatic guidance objectives which are transmitted to them by said guidance and piloting system according to the invention, such as the choice of alternative airport, the flight plan, etc.; and/or
- guide the aircraft from the outside, in particular via a fighter airplane come to meet the aircraft in difficulty.

Moreover, in a particular embodiment, said second means of said control unit, which are intended to automatically prepare and automatically execute the landing, comprise at least:

- means for automatically ordering leading-edge slats, high-lift flaps and the aircraft landing gear to be extended on approaching the alternative airport;
- means for automatically guiding the aircraft, during the landing, along a recommended approach gradient and along the axis of a runway of said alternative airport, which is used for the landing, and, once the aircraft is on the ground, for guiding it automatically along the axis of this runway which is used for the landing; and
- means for automatically slowing the aircraft on the ground.

BRIEF DESCRIPTION OF THE DRAWING

The single FIGURE of the appended drawing will give a clear understanding of how the invention can be represented. This single FIGURE is the block diagram of a guidance and piloting system according to the invention.

DETAILED DESCRIPTION OF THE INVENTION

The guidance and piloting system 1 according to the invention and represented in the FIGURE is intended to control (that is, to guide and to pilot) an aircraft (not shown), in particular a transport airplane. More specifically, it is intended to guide and pilot the aircraft to the ground, when, during a flight, the crew of this aircraft is no longer able to pilot it, in particular in the event of loss of consciousness of the pilots, for example because of a failure of the aircraft pressurization system.

It will be noted that other situations, such as food poisoning, dense smoke in the cockpit, dead or injured pilots following a fight in the cockpit, etc., can also lead to incapacity of the pilots to pilot the aircraft.

According to the invention, said guidance and piloting system 1 comprises:

- an engagement unit 2 which comprises:
  - detection means 3A, 3B, 3C, 3D which can detect engagement indications denoting incapacity of the pilot or pilots to control the aircraft; and
  - a processing means 4 which is linked to said detection means 3A to 3D and which can automatically deduce from an engagement indication received from at least one of said detection means 3A to 3D an engagement command, and send it automatically, as specified hereinbelow; and
- at least one control unit 5 which comprises:
  - at least means 6 for automatically guiding and piloting the aircraft to an alternative airport, when said engagement unit 2 has transmitted an engagement command via a link 7; and
  - means 8 for automatically preparing and automatically executing a landing of the aircraft at said alternative airport. These means 8 are active until the aircraft finally stops on a runway of said alternative airport.

Thus, thanks to the invention, when an engagement indication which signals incapacity of the pilots to control the aircraft is detected by at least one of the detection means 3A to 3D, an engagement command is sent automatically by the processing means 4 and is transmitted to the control unit 5 which, in this case, automatically guides and pilots the aircraft to an alternative airport and lands it at this alternative airport.

Consequently, when the pilots are no longer able to pilot the aircraft, the guidance and piloting system 1 according to the invention replaces them and automatically controls the aircraft until it finally stops on a runway of an alternative airport.

In a particular embodiment, said engagement unit 2 comprises at least one detection unit 9 which is linked via a link 10 to said processing means 4 and which comprises:

- at least one pressure sensor 3A which measures the pressure inside the aircraft; and/or
- one or more auxiliary sensors 3B which can be sensors measuring the pressure on the seats of the pilots (so as to detect absence of the pilots), video cameras, or smoke detectors.

The processing means 4 uses the information detected by the sensor or sensors 3A and/or 3B to diagnose an abnormal situation (pressure inside the aircraft remaining below a certain predetermined threshold for a predetermined time resulting in a risk of hypoxemia, or pressure on the seats of the pilots indicating absence of all the pilots for longer than a predetermined time for example). When the processing means 4 has diagnosed an abnormal situation, it sends an engagement command.

The engagement unit 2 can also comprise at least one means 3C which is linked via a link 11 to said processing means 4. This means is produced, for example, in the form of a dedicated pushbutton, and can be activated manually by a pilot (just before losing consciousness for example) or by any member of the crew who has previously been trained in the existence and activation of this means 3C.

Furthermore, said engagement unit 2 can also comprise a means 3D which is linked via a link 12 to said processing means 4 and which can receive via a link 13 in the way specified hereinbelow an engagement code which can be sent (from outside) to the aircraft in difficulty, either from the ground, or by a military airplane come to meet it. The reception of such an engagement command therefore leads to the activation of the control unit 5, via the transmission of an engagement command by said engagement unit 2.

Furthermore, in a particular embodiment, said guidance and piloting system 1 also comprises a unit for reversion to manual piloting 15 which enables a pilot to take over control again from the automatic system at any time, in particular if he once again feels capable of piloting the aircraft, and therefore stopping the automatic control of the aircraft applied by the system 1. This unit for reversion to manual piloting 15 comprises:

- elements 16 and 17 which can be actuated, enabling an operator to request a reversion to manual piloting; and an element 18 which is linked via links 19 and 20 respectively to said means 16 and 17 and which generates, when at least one of said elements 16 and 17 is actuated, a deactivation command that it transmits, via a link 21, to said control unit 5, in order to deactivate it. This deactivation command is also transmitted, via a link 32, to said processing means 4 in order to disable the transmission of the engagement command.

In a particular embodiment, said element 16 corresponds to an ordinary control handle of the aircraft, and said means 17 corresponds to an ordinary button for disconnecting an automatic pilot or automatic thrust control system.

Furthermore, said system 1 also comprises a communication unit 22 which comprises data reception means 23 and data transmission means 24, which is linked via the link 13 to said sensor 3D and via a link 25 to said control unit 5, and which enables said system 1 to communicate with dialog stations located outside the aircraft, by transmitting and/or receiving signals in the form of electromagnetic waves OE.

In particular, when the control unit 5 (which is automatically guiding and piloting the aircraft) is engaged, an indication concerning this engagement is sent (via this communication unit 22) to an air traffic control station and/or to surrounding airplanes, in order to notify them that the aircraft is in a totally automatic guidance situation and has no pilot to supervise it, so that they can take the necessary measures to manage the surrounding air traffic. Furthermore, provision is made for communication throughout the crisis phase between the aircraft in difficulty and control organizations, as specified hereinbelow.

Said system 1 also comprises a set 26 of information sources, which is linked via a link 27 to said control unit 5. This system 26 comprises a plurality of usual information sources used to supply parameter values representative of the state of the aircraft (quantity of fuel, system failures, etc.) and its environment (wind speed, etc.).

Moreover, said control unit 5 comprises means 28 for automatically determining the new airport, immediately the engagement unit 2 has sent an engagement command. This new airport can be the airport of departure, or a particular alternative airport, for example the nearest airport to the current position of the aircraft, or even the initially planned airport of arrival.

Preferably, said means 28 automatically select an emergency alternative airport from the nearest airports, by using in particular, as selection criteria, the following information obtained, for example, from the suite 26:

C1/intrinsic constraints relating to the state of the aircraft, such as the quantity of fuel available on board, possible failures of onboard systems, and so on, which are known on board the aircraft via the usual dedicated systems;

C2/external conditions such as wind, which are measured and/or estimated by the usual systems on board the aircraft; and C3/environmental constraints such as air spaces (prohibited zones, etc.) and conditions relating to the airports (NOTAM, CAT III capability, runway length, and so on) which can be supplied to onboard systems via a data transmission link for example.

Said means 28 also use an airport database, which is, for example, incorporated in a standard flight management system (FMS), to automatically determine the alternative airport.

Of course, said means 28 choose, as the alternative airport, an airport that is located at a distance that can be reached by the aircraft (according to the quantity of fuel, wind, aircraft performance levels, and so on) and which allows for a landing in total safety, taking into account in particular the length of the runway which is intended for the landing.

If the aircraft in difficulty is in communication (via the communication unit 22) with air traffic control or other organizations on the ground, or with a military airplane, the choice of alternative airport from the nearest airports, can be made by these sources and transmitted to the aircraft in difficulty using the unit 22.

The means 28 can also send the list of the nearest airports that they have selected, taking into account the abovementioned constraints C1, via the communication unit 22. In this case, the air traffic controller or the military airplane will validate the most appropriate alternative airport according to the abovementioned other constraints C2 and C3. The indication concerning the alternative airport is then returned to the aircraft in difficulty, via the communication unit 22.

Said control unit 5 also comprises means 29 for automatically generating a flight plan designed to reach the alternative airport selected previously (as specified hereinabove). To do this, said means 29 can use a normal navigation database of an aircraft flight management system, which makes it possible to automatically generate the approach to be followed to the landing at the selected alternative airport (based on the knowledge of the flight management system of the turning points published by the arrival/departure procedures). The means 29 add thereto a direct flight from the point at which the aircraft is currently located to the first turning point of this approach. The whole then forms the new flight plan.

In a preferred embodiment, this flight plan is transmitted automatically to air traffic control or to other organizations on the ground, via the communication unit 22, so that they know the path that the aircraft will follow. Air traffic control and/or the other organizations on the ground can also modify this flight plan and return it to the aircraft, which will then take it into account as the new flight plan to be followed in automatic guidance mode. Of course, if a military airplane has come to meet the aircraft in difficulty, the same flight plan exchange can be performed between this military airplane and said aircraft in difficulty.

The control unit 5 also comprises means 30 for generating in-flight guidance instructions (roll, trim, engine behavior, etc) enabling the aircraft to follow the flight plan generated by the means 29 to the landing at the selected alternative airport. These guidance commands are transmitted to the usual control means 31 of the aircraft, that is, to means of actuating controlled elements such as control surfaces (flanking rudders, elevators, rudders, and so on) and/or engines. In the case where a military airplane has come to meet the aircraft in difficulty, an alternative is for this airplane itself to establish the flight plan to be followed and then send to the aircraft in difficulty only longitudinal and lateral guidance instructions to follow this military airplane, for example by providing a heading instruction and a vertical speed instruction. These guidance instructions are received by the communication unit 22 and applied to the control means 31.

Moreover, said means 8 of said control unit 5 comprise at least the following integrated means (not specifically illustrated):

means for automatically ordering leading edge slats, high-lift flaps and the landing gear of the aircraft to be extended on approaching the alternative airport, compliant with the operational procedures as described in the FCOM manual (Flight Crew Operating Manual). According to the invention, these means control the sequencing of the extension of leading-edge slats, high-lift flaps and landing gear at predetermined instants, positions or altitudes along the runway approach axis;

means for automatically guiding the aircraft along a recommended approach gradient and along the axis of a runway of said alternative airport, which is used for the landing, and, once the aircraft is on the ground, for guiding it automatically along the axis of this runway which is used for the landing; and means for automatically selecting the braking level (for example, maximum braking), and means for automatically slowing the aircraft on the ground according to this selected braking level.

The guidance and piloting system 1 according to the invention presents very many advantages. Examples of such advantages include:

concerning activation, the system 1 makes it possible to identify the failure of the pilots (inability to pilot) and engage automatic guidance toward an alternative airport. This means that the aircraft can be returned to the ground in total safety, notably in case of loss of consciousness of the pilots, and therefore prevents the aircraft from crashing;

concerning the automatic navigation and guidance, the system 1 provides an automatic choice of an alternative airport and an automatic reconfiguration of the flight plan taking into account a certain number of internal and external constraints;

concerning the automatic piloting, the system 1 includes automation of the essential actions that the pilots must perform to fly to the alternative airport and execute a complete landing of the aircraft. The characteristics intended for this purpose, and in particular the extension of appropriate configurations of leading edge slats and high-lift flaps, the lowering of the landing gear, the selection of the braking level and the execution of the braking, do not exist on the current automatic piloting systems; and concerning a possible role of air traffic control, of an organization on the ground or of a fighter plane come to meet the aircraft, the system 1 proposes taking over from the pilot or pilots in case of incapacity to control the aircraft, by providing a new role for these organizations. This new role can in particular consist in:

assisting in the automatic guidance of the aircraft (management of surrounding aircraft, evacuation of the chosen runway, and so on);

validating automatic guidance objectives (choice of alternative airport, choice of flight plan, etc.); and performing external guidance of the aircraft (via a fighter plane or any other entity).

The invention claimed is:

1. An aircraft guidance and piloting system, comprising:
an engagement unit which comprises:
at least one engagement detector that detects indications that signal pilot inability to control the aircraft, and
a processor linked to the detector that deduces the detected indications and transmits an engagement command;
at least one control unit which comprises:
a guidance and piloting unit that guides and pilots the aircraft towards an alternative airport upon receipt of the transmitted engagement command from the processor, said guidance and piloting unit comprising:
an aircraft control unit that actuates aircraft control elements, and
an alternative airport determination unit that determines the alternative airport; and
a landing unit that prepares and executes a landing of the aircraft at said determined alternative airport, said landing unit comprising:
a landing controller that orders leading-edge slats, high-lift flaps and aircraft landing gear to be extended on approaching the alternative airport,
a guidance controller that guides the aircraft, during landing, along an approach gradient and along a runway axis of the alternative airport, and upon landing, guides the aircraft along the runway axis, and
a ground speed controller that slows ground speed of the aircraft; and
a communication unit which comprises a data receiver and a data transmitter, in which the communication unit communicates with dialog stations located outside the aircraft, wherein
the communication unit is linked to said control unit so that the data receiver receives longitudinal and lateral guidance instructions from outside the aircraft and the data transmitter transmits the instructions to said control unit so as to provide for external guidance of the aircraft.

2. The system as claimed in claim 1, wherein said engagement unit comprises at least one of the following:
at least one sensor which measures at least one parameter value inside the aircraft;
at least one actuation unit actuated manually by an operator; and
an engagement command receiver which receives an engagement code from outside the aircraft.

3. The system as claimed in claim 1, further comprising a manual piloting unit which comprises at least one manual actuator which enables an operator to request a reversion to manual piloting and a deactivation command unit which generates, upon actuation of the manual actuator, a deactivation command and transmits the deactivation command to said control unit.

4. The system as claimed in claim 3, wherein the at least one manual actuator is an aircraft control handle.

5. The system as claimed in claim 1, wherein said airport determination unit determines the alternative airport from at least one of the following selection criteria:
intrinsic constraints relating to aircraft status;
external conditions; and
environmental constraints.

6. The system as claimed in claim 1, wherein said guidance and piloting unit comprises a flight plan generator that generates a flight plan for reaching said alternative airport.

7. The system as claimed in claim 1, wherein said guidance and piloting unit comprises a guidance instruction generator that generates guidance commands for guiding the aircraft to the alternative airport.

8. An aircraft, which comprises the guidance and piloting system of claim 1.

* * * * *